US012706525B2

(12) United States Patent
Chen et al.

(10) Patent No.: US 12,706,525 B2
(45) Date of Patent: Aug. 11, 2026

(54) DRIVER ARRANGEMENT INCLUDING POWER FACTOR CORRECTION CIRCUITRY

(71) Applicant: SIGNIFY HOLDING B.V., Eindhoven (NL)

(72) Inventors: Zhiquan Chen, Shanghai (CN); Jie Fu, Shanghai (CN); Yu Wang, Shanghai (CN); Gang Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 64 days.

(21) Appl. No.: 18/862,652

(22) PCT Filed: Apr. 25, 2023

(86) PCT No.: PCT/EP2023/060762

§ 371 (c)(1),
(2) Date: Nov. 4, 2024

(87) PCT Pub. No.: WO2023/213613

PCT Pub. Date: Nov. 9, 2023

(65) Prior Publication Data

US 2025/0350186 A1 Nov. 13, 2025

(30) Foreign Application Priority Data

May 6, 2022 (WO) ................ PCT/CN2022/091315
Jun. 14, 2022 (EP) .................................... 22178958

(51) Int. Cl.

*H02M 1/08* (2006.01)
*H02M 1/00* (2007.01)

(Continued)

(52) U.S. Cl.

CPC ........... *H02M 1/08* (2013.01); *H02M 1/0012* (2021.05); *H05B 45/355* (2020.01); *H05B 45/3725* (2020.01)

(58) Field of Classification Search

CPC .. H02M 1/0012; H02M 1/007; H02M 1/0077; H02M 1/08; H02M 1/15;

(Continued)

(56) References Cited

U.S. PATENT DOCUMENTS 8,520,420 B2 * 8/2013 Jungreis .............. H02M 3/3376 363/17
8,687,382 B2 * 4/2014 Chen .................. H02M 1/4258 363/16

(Continued)

FOREIGN PATENT DOCUMENTS

CN 105517253 B 6/2017
JP H01218355 A 8/1989

(Continued)

*Primary Examiner* — Raymond R Chai

(57) ABSTRACT

A mechanism for controlling a supply voltage for a switched-mode power supply designed for compensating an AC mains power ripple in a PFC output signal produced by a power factor converter. An adjustment circuit is used to synchronize the amplitude of the supply voltage with the amplitude of an offset signal generated by the switched-mode power supply used to compensate for the AC mains power ripple in the PFC output signal. Said synchronizing regulates the difference between the voltage amplitude of the adjusted supply voltage and the voltage amplitude of the offset signal, thereby controlling the power loss of the switched-mode power supply.

15 Claims, 3 Drawing Sheets

(51) Int. Cl.
*H05B 45/355* (2020.01)
*H05B 45/3725* (2020.01)

(58) Field of Classification Search
CPC .... H02M 1/42; H02M 3/335; H02M 3/33561; H05B 45/355; H05B 45/3725; H05B 45/382; H05B 45/385; Y02B 70/10
See application file for complete search history.

(56) References Cited

U.S. PATENT DOCUMENTS

| | | | | |
|---|---|---|---|---|
| 10,879,805 | B2 * | 12/2020 | Notsch | H02M 3/33507 |
| 2014/0252973 | A1 * | 9/2014 | Liu | H02J 1/02<br>315/200 R |
| 2017/0288557 | A1 * | 10/2017 | Fang | H02M 1/15 |

FOREIGN PATENT DOCUMENTS

| | | | |
|---|---|---|---|
| JP | H0731145 | A | 1/1995 |
| JP | 2000125547 | A | 4/2000 |

* cited by examiner

DRIVER ARRANGEMENT INCLUDING POWER FACTOR CORRECTION CIRCUITRY

CROSS-REFERENCE TO PRIOR APPLICATIONS

This application is the U.S. National Phase application under 35 U.S.C. § 371 of International Application No. PCT/EP2023/060762, filed on Apr. 25, 2023, which claims the benefit of International Application No. PCT/CN2022/091315, filed on May 6, 2022 and European Patent Application Ser. No. 22/178,958.9, filed on Jun. 14, 2022. These applications are hereby incorporated by reference herein.

FIELD OF THE INVENTION

The present invention relates to the field of driver arrangements, particularly those that include power factor correction circuitry.

BACKGROUND OF THE INVENTION

Driver arrangements are commonly used to provide power to a load, such as a light emitting element. Typically, a driver arrangement will be capable of converting (e.g., AC) input power to (e.g., DC) output power suitable for powering the load. Some driver arrangements comprise power factor correction circuity, for modifying or adjusting a power factor of a power factor correction (PFC) output signal that defines the output power provided to the load or on a bus.

The PFC output signal may be a signal across an output capacitor of the power factor correction circuitry, so that it is smoothed to emulate a DC signal. However, the power factor correction circuity is a slow-response converting circuity which regulates its output by sensing an average output. The PFC output signal will therefore retain a ripple (voltage, or current) of around 100/120 Hz, the precise frequency of which depends upon depending on the ripple of the AC input power, which is typically around 50/60 Hz. It would be advantageous to reduce or attenuate the size of the ripple in the PFC output signal, e.g. remove or compensate for the ripple, especially for LED lighting since the output luminous flux of an LED lighting arrangement is highly sensitive to the power provided to the LED lighting arrangement. The ripple of the PFC output signal, if not regulated, will result in a corresponding ripple in the brightness of light output by the LED, which would cause human perceptible or capturing device (such as camera) perceptible flicker.

A common way of overcoming this issue in the art is to use a second converting circuity cascading from the power factor correction circuity. This topology can be labelled a double-stage converting circuitry. The second converting circuitry regulates the PFC output signal into a further stabilized signal. One drawback of such double-stage converting circuitries is high material cost and high space requirements, since the second converting circuitry has to handle the whole PFC output signal meaning that its power rating is quite high requiring large and materially expensive components.

It has been proposed to use a switching converting circuitry, or switched-mode power supply, at the output of the power factor correction circuity, where the switching converting circuitry is used for compensating just the AC component of the PFC output signal, and not the whole PFC output signal. This means that the power rating of the switching converting circuitry is relatively smaller and has a lower cost and size compared to the double-stage converting circuitry. A suitable prior art example is described by US20140252973A1 and US 2017/0288557 A1. This topology is often called/labelled a 1.5 stage or 1.25 stage converting circuitry, compared with the above mentioned double-stage.

There is an ongoing desire for improved driver arrangements

SUMMARY OF THE INVENTION

The invention is defined by the claims.

For LED applications, the driver arrangement may be a universal driver and connected to a particular one of a variety of potential/possible LED load/modules with different LED forward voltages. Even after the driver arrangement is connected to a particular LED module, that module's LED forward voltage may also be dynamically changed when one or more of the LEDs in the LED module are short-circuited or bypassed, e.g., for dimming or color changing. In this case, the output voltage of the driver arrangement, and effectively the output voltage of the switching converting circuitry, is likely to be variable due at least to a selection of the LED module or even in dynamic operation of the driver arrangement and the LED module.

The inventors have identified that the mean difference between the supply voltage to the switched-mode power supply and the voltage of the offset signal (produced by the switched-mode power supply to compensate for the AC component of the PFC output signal) can be significant, especially if the load powered by the driving arrangement requires a low voltage, e.g., such as when the LED module acting as the load is a low voltage LED module but the input to the supply voltage to the switched-mode power supply is quite large. It has been recognized that this would significantly affect the power efficiency of the switched-mode power supply.

The inventors have also identified that the supply voltage to the switched-mode power supply will inherently be out-of-phase with the offset signal produced by the switched-mode power supply to compensate for the AC component of the PFC output signal. This is because the offset signal is likely to be out-of-phase of the PFC output signal such that they are superimposed into a smoothed signal, and because the PFC output signal is likely to be in-phase with the input to the switched-mode power supply, particularly in the case when the supply voltage is produced using a winding that is magnetically coupled to a winding through which the AC mains supply is provided. As the input and output voltages are out-of-phase, there is a significant impact on power loss in the switched-mode power supply.

One or both of these problems can be overcome by using the approach proposed by the present disclosure, namely providing an adjustment circuit to adjust the voltage supply to the switched-mode power supply. The adjustment can be performed to synchronize the voltage supply, e.g., in terms of mean voltage and/or instantaneous voltage (in other words, phase), with the offset signal produced by the switched-mode power supply. This can significantly reduce a power loss in the switched-mode power supply, and increase the efficiency of the driving arrangement.

According to examples in accordance with an aspect of the invention, there is provided a driver arrangement comprising a power factor correction, PFC, converter comprising: a first input interface configured to receive an AC mains power; a PFC conversion circuitry configured to perform power factor correction on the AC mains power and generate a PFC output signal having a ripple corresponding to a ripple of the AC mains power; and a first output interface configured to provide the PFC output signal.

The driver arrangement also comprises a power supply for providing a supply voltage from the AC mains power; and a switched-mode power supply arrangement comprising: a second input interface coupled to the power supply and configured to receive the supply voltage from the power supply; a second output interface electrically connected in series with the first output interface; and a switched-mode power supply configured to convert the supply voltage into an offset signal provided to the second output interface, the offset signal being configured to superimpose the PFC output signal, to produce a superimposed signal, and compensate for the ripple corresponding to the AC mains power.

More significantly, the driver arrangement further comprises an adjustment circuit electrically coupled between the power supply and the second input interface, and configured to adjust the supply voltage provided to the second input interface to be in-synchronization with the offset signal so as to regulate the difference between the voltage amplitude of the adjusted supply voltage and the voltage amplitude of the offset signal.

Embodiments provides a mechanism for adjusting or modifying a supply voltage used by a switched-mode power supply to provide an offset signal to be in synchronization or otherwise aligned with the offset signal. Since the input and the output of the switched-mode power supply are synchronized, the voltage difference across the switched-mode power supply is reduced, and approaches are able to significantly reduce a power loss by the switched-mode power supply, providing a more efficient driver arrangement.

Embodiments make use of an adjustment circuit coupled between a power supply and an input interface to the switched-mode power supply to adjust the voltage supply provided by the power supply. The adjustment circuit thereby controls the voltage of the voltage supply.

The superimposed signal is the combination of the PFC output signal and the offset signal, i.e., the PFC output signal superimposed with the offset signal. Put another way, the superimposed signal is the superimposition of the PFC output signal and the offset signal.

The adjustment circuit may be adapted to adjust the supply voltage in-synchronization with the offset signal such that the difference between the voltage amplitude of the adjusted supply voltage and the voltage amplitude of the offset signal is regulated, preferably reduced, thereby controlling, preferably reducing, the power loss of the switched-mode power supply. This approach provides an effective mechanism for controlling or modifying the power loss of the switched-mode power supply by controlling the difference of input and output voltage.

The adjustment circuit may comprise a sensing circuit to sense a voltage of the offset signal and/or a voltage of the superimposed signal and the offset signal. The adjustment circuit may be configured to adjust the supply voltage responsive to the sensed voltage of the offset signal and/or the voltage of the superimposed signal. In this way, the adjustment circuit is able to adapt and respond to changes in the offset signal or changes in the voltage drawn by a load powered by the driver arrangement. This provides an approach that is dynamically and automatically responsive to thereby actively control or reduce power losses in the switched-mode power supply. Please note that there could be alternatives to this embodiment. For example, the driver arrangement may be provided with a user interface to receive (from a user via a user input) a setting related to the amplitude of the offset signal or the superimposed signal, and the adjustment circuit may be adapted to adjust the supply voltage according to the setting.

The adjustment circuit may be configured to: for a first voltage of one of the offset signal or the superimposed signal, provide the adjusted supply voltage of a second voltage; and for a third voltage of the one of the offset signal or the superimposed signal, provide the adjusted supply voltage of a fourth voltage, wherein the first voltage is greater than the third voltage and the second voltage is greater than the fourth voltage. This approach provides a reactive or dynamically responsive adjustment circuit to react to any ongoing changes in the offset signal and/or the power drawn by the load, to improve power efficiency of the overall driver arrangement. If the needed output voltage is large, the supply voltage will be adjusted into a large input voltage so that the switched-mode power supply is able to operate; and if the needed output voltage is small, the supply voltage will be adjusted into a small input voltage so that the power loss on the switched-mode power supply is small.

The first, second, third and fourth voltage may be instantaneous voltages or mean voltages.

In some more specific examples, the adjustment circuit is adapted to adjust the mean value of the supply voltage to be in-synchronization with the mean value of the offset signal. This embodiment thereby adjusts the mean value of the supply voltage synchronously with the mean value of the offset signal. This can reduce a difference between the mean value/voltage at the input and output of the switched-mode power supply, thereby increasing an efficiency of the switched-mode power supply. In particular, it is possible to reduce losses in the switched-mode power supply if the mean voltage of the offset signal is low.

In some examples, the PFC conversion circuitry comprises a transformer having a primary winding electrically coupled to the first input interface and a first secondary winding magnetically coupled to the primary winding and electrically coupled to the first output interface; and the power supply comprises a second secondary winding magnetically coupled to the primary winding.

The adjustment circuit may be configured to provide an adjustable ratio or proportion of the mean voltage across the second secondary winding to the second input interface as the mean voltage of the supply voltage. This provides an effective and space-efficient mechanism for controlling the mean voltage of the supply voltage, e.g., for use in synchronizing the mean voltage of the supply voltage with the mean voltage of the offset signal for improved power efficiency of the switched-mode power supply.

The adjustment circuit may comprise a switch arrangement coupled between the second secondary winding and the second input interface, the switch arrangement being configured to switch between at least two configurations including: a first configuration in which a mean voltage across a first ratio or proportion of the second secondary winding is provided to the second input interface as the mean voltage of the supply voltage; and a second configuration in which a mean voltage across a second ratio or proportion, lower than the first ratio or proportion, of the second secondary winding is provided to the second input interface as the mean voltage of the supply voltage.

The switch arrangement provides an effective and power-efficient mechanism for controlling or changing the mean voltage of the supply voltage. In particular, power losses in such a switch arrangement are extremely low. This is achieved by providing a corresponding ratio or portion of the secondary winding, thereby a correspondingly adjusted supply voltage to the second input interface.

The adjustment circuit may be configured to adjust the mean value of the supply voltage in-synchronization with the mean value of the offset signal by: operating the switch arrangement in the first configuration, such that the mean voltage of the adjusted supply voltage is high, responsive to the voltage of the offset signal being at or above a first predetermined voltage; and operating the switch arrangement in the second configuration, such that the mean voltage of the adjusted supply voltage is low, responsive to the voltage of the offset signal being below the first predetermined voltage.

This provides a mechanism that reduces the mean voltage of the supply voltage when the offset signal has a lower voltage. This reduces the difference between the supply voltage and the voltage of the offset signal, thereby providing a more efficient switched-mode power supply, whilst also allowing the supply voltage to increase when more voltage is required for the offset signal (e.g., to ensure that a required voltage need can be met). This provides a supply voltage that dynamically reacts to improve the efficiency of the switched-mode power supply whilst still ensuring that voltage demands of the SMPS are met.

The adjustment circuit may be configured to increase the mean voltage of the supply voltage with an increasing mean voltage of the superimposed signal and/or the offset signal. In this way, the mean voltage of the supply voltage can track the mean voltage of the offset signal. Advantages of this approach have been previously identified.

Alternatively or additionally to adjusting the mean voltage in-synchronization, the adjustment circuit may be adapted to adjust the instantaneous value of the supply voltage to be in-synchronization or in-phase with the instantaneous value of the offset signal. Thus, the phase of the voltage supply can track or be synchronized with the phase of the offset signal and the real time input/output voltage difference is reduced. This increases an efficiency of the switched-mode power supply by ensuring a consistent difference between the input and output of the SMPS.

The adjustment circuit may comprise: a buffering circuit electrically coupled to the power supply and adapted to generate a bias voltage with a substantially stable amplitude; and an inverting circuit configured to subtract, from the bias voltage, a voltage proportional to the voltage of the PFC output signal to produce the adjusted supply voltage for the second input interface.

If present, the switch arrangement is able to provide the adjusted mean voltage of the supply voltage (by defining the magnitude of the bias voltage) and store it in the buffering circuit, e.g. to track the mean voltage of the offset signal, whilst the inverting circuit is able to provide the adjusted instantaneous voltage of the supply voltage, e.g., to track the instantaneous voltage of the offset signal. This combination significantly improves the power efficiency of the SMPS.

As previously explained, in some examples the PFC conversion circuitry comprises a transformer having a primary winding electrically coupled to the first input interface and a first secondary winding magnetically coupled to the primary winding and electrically coupled to the first output interface; and the power supply comprises a second secondary winding magnetically coupled to the primary winding, such that a voltage across the second secondary winding changes proportionally with the voltage of the PFC output signal.

In such examples, the inverting circuit may be configured to subtract, from the bias voltage, a voltage proportional to the voltage across the second secondary winding to produce the supply voltage for the second input interface. This approach means that the phase of the supply voltage will be out of phase with that of the PFC output signal and therefore synchronized or in-phase with the offset signal.

There is also proposed an electronic arrangement comprising the driver arrangement herein proposed and/or claimed; and a load connected to the first output interface and second output interface and configured to be powered by the superimposed signal.

The load may comprise a light emitting arrangement optionally comprising one or more light emitting diodes.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
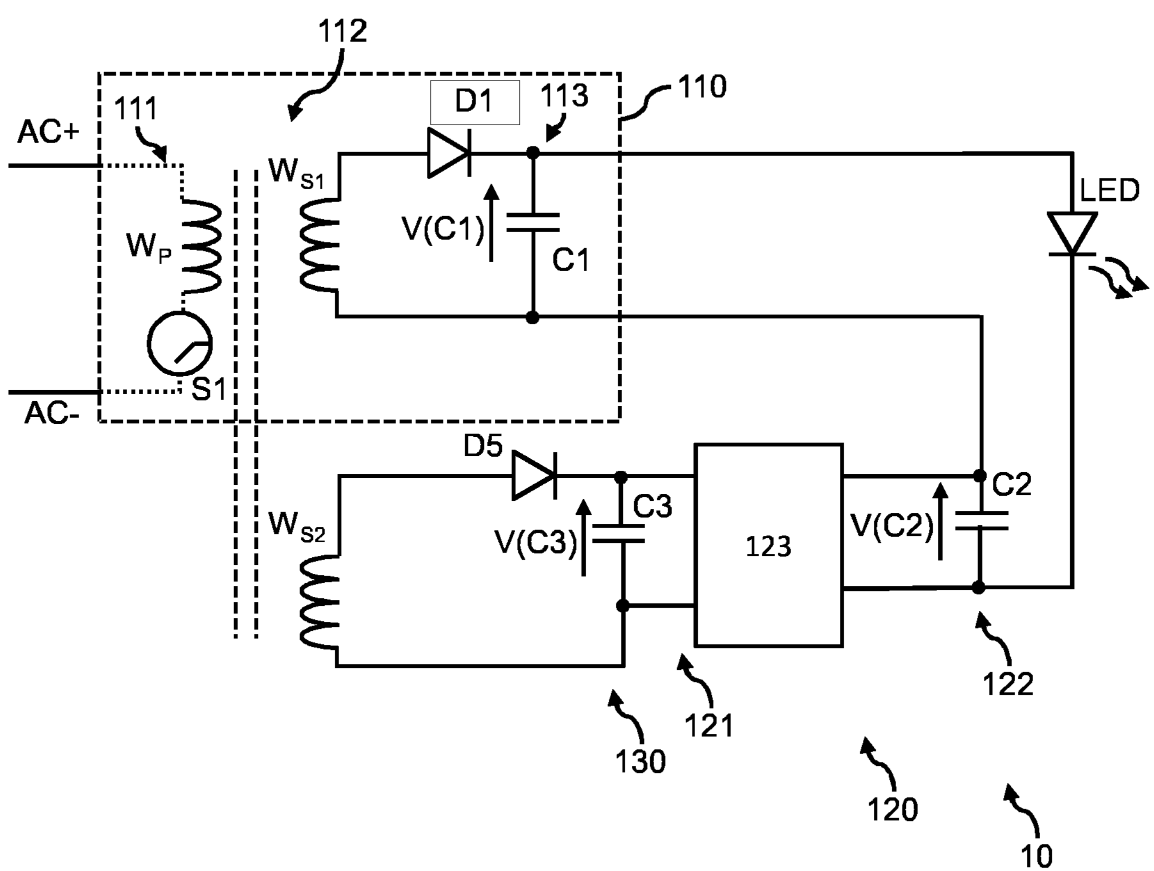
FIG. 1 illustrates an existing driver arrangement.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a mechanism for controlling a supply voltage for a switched-mode power supply designed for compensating an AC mains power ripple in a PFC output signal produced by a power factor converter. An adjustment circuit is used to synchronize the amplitude of the supply voltage with the amplitude of an offset signal generated by the switched-mode power supply used to compensate for the AC mains power ripple in the PFC output signal.

FIG. 1 illustrates an existing driver arrangement 100, for the purposes of improved contextual understanding. The driver arrangement 100 is configured to provide a load powering signal, which can alternatively be labelled a superimposed signal, to a load LED, which is separate to the driver arrangement.

The driver arrangement 100 may form part of an electronic arrangement 10 comprising the driver arrangement 100 and the load LED. The load LED may, for instance, comprise one or more light emitting diodes or a light emitting diode arrangement. Other suitable loads will be apparent to the skilled person.

The driver arrangement 100 comprises a power factor correction converter 110, a switched-mode power supply arrangement 120 and an adjustment circuit 130.

The power factor correction converter 110 comprises a first input interface 111 configured to receive an AC mains power AC+, AC−.

The power factor correction converter 110 also comprises a PFC conversion circuitry 112 configured to perform power factor correction on the AC mains power to produce a PFC output signal V(C1).

The power factor correction converter 110 also comprises a first output interface 113 configured to provide the PFC output signal V(C1). For the purposes of improved contextual understanding, assume the mean amplitude of the PFC output signal V(C1) is unchanged.

The PFC output signal V(C1) will have a (voltage) ripple corresponding to the ripple of the AC mains power. Thus, the ripple may follow the inherently 50/60 Hz sinuous waveform of the AC mains. Generally, power factor correction converters are configured to correct or account for a distortion in power provided to a load or drawn by a load. In general, the output of the power factor correction circuitry follows the inherently 50/60 Hz sinuous waveform of the AC mains, resulting in an AC mains power ripple in the PFC output signal V(C1).

To at least partially reduce a high frequency switching signal in the PFC output signal V(C1), the power factor conversion circuitry may comprise a first output capacitor C1 connected across the first output interface 113, such that the PFC output signal V(C1) is a near-continuous signal that can be drawn by a load connected to the first output interface 112. However, the PFC output signal V(C1) will still have a low frequency ripple, representing the residual periodic variation resulting from the AC mains power (which has not been suppressed). Indeed, a PFC converter is designed to keep the low frequency ripple, as otherwise the output would not follow the input.

In the illustrated example, the PFC conversion circuitry comprises a flyback converter, which is an example of a buck-boost converter. Accordingly, the PFC conversion circuitry comprises a transformer formed of a primary winding $W_P$ and a first secondary winding $W_{S1}$. A diode D1 couples the first secondary winding $W_{S1}$ to the first output interface, and thereby the first output capacitor C1. Current flow through the primary winding $W_P$ is controlled by a switching element S1.

However, other suitable PFC conversion circuitry layouts for use in embodiments are well known in the art. As an example, the PFC conversion circuitry 112 may be or comprise a boost converter, a buck converter and/or a buck-boost converter. Those skilled in the art would understand that any other type of converter is also applicable as long as it can provide PFC functionality.

In any event, the PFC conversion circuitry comprises a transformer formed of a primary winding $W_P$ and a first secondary winding $W_{S1}$, e.g., to at least galvanically isolate the AC mains power AC+, AC− from the remainder of the driver arrangement and/or the load LED.

The switched-mode power supply arrangement 120 comprises a second input interface 121 coupled to a power supply $W_{S2}$ and configured to receive a supply voltage V(C3) from the power supply. The supply voltage V(C3) is therefore a voltage between a first terminal 121A of the second input interface 121 and a second terminal 121B of the second input interface 121. Here, the power supply $W_{S2}$ comprises a second secondary winding magnetically coupled to the primary winding $W_P$ of the power conversion circuitry 112. Due to the magnetic coupling of the windings, the supply voltage V(C3) tends to be in phase with the PFC output voltage V(C1).

The switched-mode power supply arrangement 120 also comprises a second output interface 122 electrically connected in series with the first output interface 121.

The switched-mode power supply arrangement 120 further comprises a switched-mode power supply 123 configured to convert the supply voltage into an offset signal V(C2) provided to the second output interface 122. The offset signal is configured to superimpose the PFC output signal V(C1) and compensate for the ripple corresponding to the AC mains power.

The switched-mode power supply 123 is configured to compensate for the ripple in the PFC output signal V(C1). More specifically, the switched-mode power supply is configured to generate an offset signal V(C2) which is then superimposed with the PFC output signal V(C1) to produce a superimposed signal, which is here equal to V(C1)+V(C2). The superimposed signal is provided to or drawn by the load LED, and can thereby be alternatively labelled a load powering signal. The offset signal V(C2) thereby compensates the ripple (of the AC mains power) in the PFC output signal V(C1) to thereby smooth the power provided to the load LED.

The offset signal V(C2) is provided to a second output interface 122. In the illustrated example, the second output interface is connected in series with the first output interface 112. The load LED is connectable between or across the first 112 and second 122 output interfaces. Thus, the superimposed signal may be the signal across the first and second output interfaces.

A second output capacitor C2 may be connected between the terminals of the second output.

The switched-mode power supply can be implemented by a current control loop to control its output according to a sensed current flowing through the load LED powered by the load power signal. More specially, the operation of the switched-mode power supply 120 may be responsive to the electrical current through the load LED, e.g., a voltage across a sensing resistor (not shown) connected in series with the load LED. The shown offset signal V(C2) is the resultant voltage of the current control loop.

In this way, the driver arrangement may comprise a current control loop adapted to sense an electrical current of the superimposed signal and control the switched-mode power supply to regulate the offset signal V(C2) such that the sensed current follows an electrical current reference which is optionally substantially constant.

In particular, the switched-mode power supply may be configured to control the offset signal V(C2) such that the electrical current through the load LED is aligned with an electrical current reference. The electrical current reference is preferably constant or near-constant, i.e., substantially constant. This process is called constant current regulation. This means that the offset signal V(C2) will track the AC mains power ripple in the PFC output signal V(C1), thereby compensating for this ripple in the PFC output signal.

The control of the switched-mode power supply 120 may be a high-speed control loop, to ensure that the offset signal V(C2) varies along with the ripple in the PFC output signal V(C1).

In one example, in case that the load (e.g., a first LED) with a smaller forward voltage is replaced by a load with a larger forward voltage (e.g., a second LED with a larger forward voltage), first the load current will be less than the electrical current reference and in turn the switched-mode power supply 120 will increase its output voltage. The system will converge at a state wherein the PFC output signal and the offset signal together output a same load current, equal with the electrical current reference.

Examples of suitable switched-mode power supplies include buck converters or buck-boost converters. Other examples will be apparent to the skilled person.

Approaches for controlling a switched-mode power supply to compensate for the AC mains power ripple in the PFC output signal are established in the art, e.g., as demonstrated by US 2017/0288557 A1.

In the existing art, the adjustment circuit 130 comprises a rectifying diode D5 and an input capacitor C3 that is connected across the terminals of the second input interface 121. The input capacitor C3 is configured to smooth the rectified signal provided by the rectifying diode, e.g. to attenuate high-frequencies. The size of the input capacitor C3 will not be sufficient to attenuate the AC mains power voltage ripple.

Figure 2:
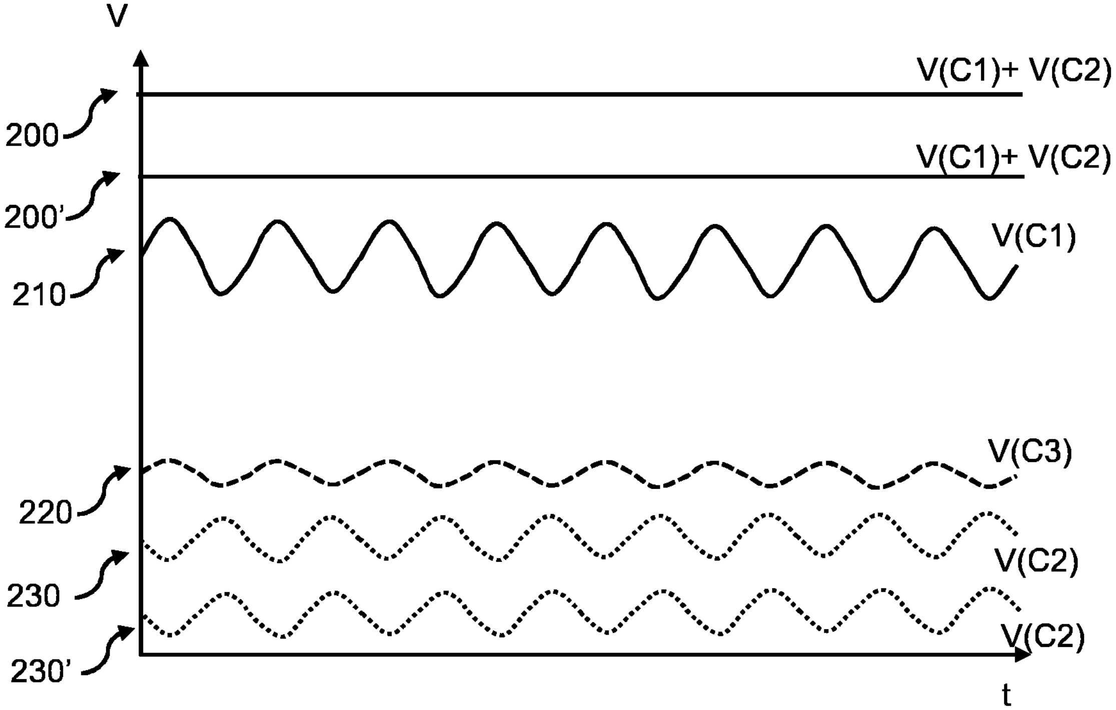
FIG. 2 illustrates waveforms for the existing driving arrangement.

For improved understanding, FIG. 2 illustrates waveforms of the driver arrangement 100 known in the art.

A first waveform 210 illustrates the voltage of the PFC output signal V(C1). A second waveform 220 illustrates the voltage of the supply voltage V(C3) across the second input terminal. A third waveform illustrates the voltage of the offset signal V(C2) across the second output terminal.

As demonstrated in FIG. 2, e.g., where the switched-mode power supply is a buck converter, the voltage of the supply voltage V(C3) and the voltage of the offset signal V(C2) are out of phase with one another. In particular, the supply voltage V(C3) will follow the PFC output signal V(C1). Accordingly, when the PFC output signal V(C1), and therefore the supply voltage V(C3), is in a valley or trough 210, the offset signal V(C2) at a peak 220 to compensate the ripple in the PFC output signal.

It has been recognized that this will significantly affect the efficiency of the switched-mode power supply, as there is a large voltage difference between the input and output of the switched-mode power supply at the peaks and troughs, as well the difference between the input and output being inconsistent.

Furthermore, the mean voltage of the supply voltage V(C3) is almost constant since the mean voltage of the PFC output signal voltage is usually fixed. Thus, changes in the required mean voltage for the offset signal can significantly affect the average voltage difference between the supply voltage V(C3) and the offset signal V(C2), which can significantly increase the power loss by the switched-mode power supply.

When the second LED (with a relatively large forward voltage) is connected, the offset signal V(C2) illustrated by waveform 230 (as well as the load powering signal or superimposed signal illustrated by waveform 200) is relatively large. Thus, the difference between the supply voltage 220 V(C3) and the offset signal 230 is still fine or within acceptable boundaries. However, when the first LED (with a relatively low forward voltage) is connected, the offset signal V(C2) illustrated by waveform 230' (as well as the load power signal illustrated by waveform 200') is small, the difference between the supply voltage 220 V(C3) and the offset signal 230' becomes large and causes more/significant power loss in the switched-mode power supply, e.g., outside of acceptable boundaries.

Another problem is that the supply voltage 220 and the offset signal 230 or 230' are out of phase, when the supply voltage 220 is at a peak value, the offset signal 230 or 230' is at a valley value thus it causes power loss in the switched-mode power supply.

Proposed techniques provide mechanisms for overcoming these issues. In particular, it is proposed to use an adjustment circuit that is able to modify or change the supply voltage V(C3) input to the switched-mode power supply in-synchronization or synchronously (e.g., in terms of phase and/or average voltage) with the offset signal V(C2) output by the switched-mode power supply.

The present disclosure proposes a new adjustment circuit for use with a driver arrangement. The adjustment circuit is configured to substantially adjust the supply voltage V(C3), that is provided to the second input interface of the switched-mode power supply arrangement, in-synchronization with the offset signal. Thus, the phase and/or amplitude of the supply voltage may be modified or changed synchronously with changes in the phase and/or amplitude of the offset signal. Here the term “substantially adjust” means that the amplitude of the supply voltage is adjusted by more than 10%, preferably more than 25%, excluding trivial filtering or smoothing.

Figure 3:
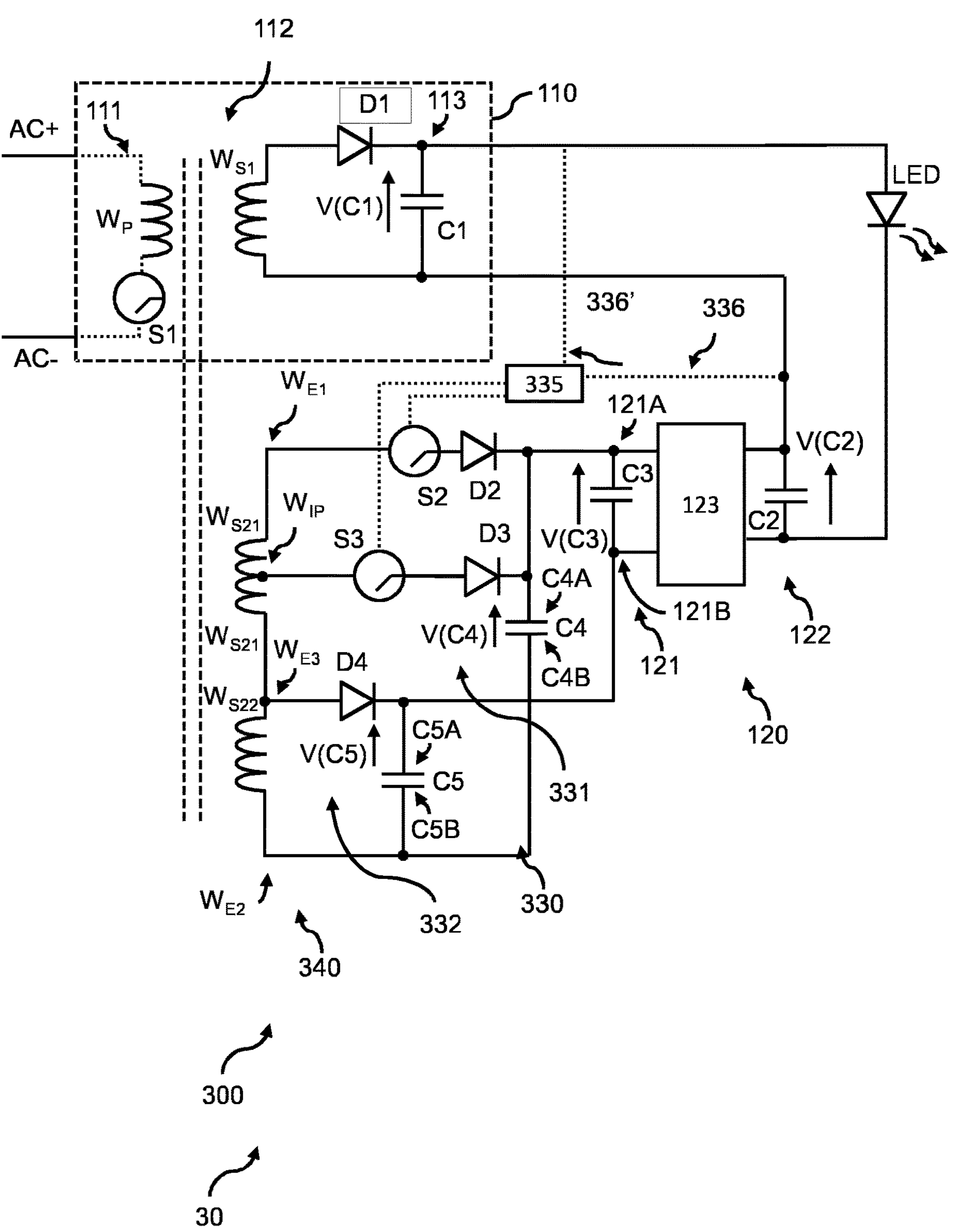
FIG. 3 illustrates a proposed driver arrangement.

FIG. 3 illustrates a driving arrangement 300 according to an embodiment. As before, the driver arrangement 300 is configured to provide a load powering signal (or superimposed signal) to a load LED, which is separate to the driver arrangement.

The driver arrangement 300 may form part of an electronic arrangement 30 comprising the driver arrangement 300 and the load LED. The electronic arrangement 30 is another embodiment. The load LED may, for instance, comprise one or more light emitting diodes or a light emitting diode arrangement. Other suitable loads will be apparent to the skilled person.

The driving arrangement 300 differs from the previously described driving arrangement in the configuration of the adjustment circuit 330. The adjustment circuit 330 allows for adjustment of both the (average) magnitude of the supply voltage V(C3) and/or the phase of the supply voltage V(C3).

Thus, the adjustment circuit 330 is configured to adjust the supply voltage provided by the power supply 340 to produce an adjusted supply voltage (that is received by the second input interface 121 (121A and 121B).

More particularly, the adjustment circuit 330 is adapted to adjust the supply voltage V(C3) in-synchronization with the offset signal V(C2) such that the difference between the voltage amplitude of the adjusted supply voltage and the voltage amplitude of the offset signal is regulated. This allows for control over the power loss of the switched-mode power supply being controlled.

The adjustment circuit is configured to adjust a mean value of the supply voltage, to thereby synchronize mean value of the adjusted supply voltage with the mean value of the offset signal.

Additionally or alternatively, the adjustment circuit is configured to invert the phase of the supply voltage, to thereby synchronize the phase of the adjusted supply voltage with the phase of the offset signal.

The power supply 340 for the adjustment circuit comprises a second secondary winding $W_{S21}$, $W_{S22}$, which has a first end $W_{E1}$ and a second end $W_{E2}$. The second secondary winding is magnetically coupled to the primary winding $W_P$ of the PFC conversion circuitry 112. As previously explained, the voltage across the second secondary winding and any tap portion thereof will change in-phase with the voltage across the first secondary winding $W_{S1}$ of the PFC conversion circuitry 112.

The second secondary winding is formed of (at least) two secondary winding portions, namely a first secondary winding portion $W_{S21}$ and a second secondary winding portion $W_{S23}$, which are connected in series.

In order to adjust the supply voltage in synchronization with the offset signal in terms of mean value, the adjustment circuit 330 is configured to modify or change the effective number of turns/ratio of the second secondary winding that contribute to the supply voltage provided to the second input interface. This approach effectively provides an adjustable ratio or proportion of the magnitude of the voltage across the second secondary winding as the magnitude of the adjusted supply voltage provided to the second input interface.

To adjust the magnitude of the supply voltage provided to the second input interface 121, the adjustment circuit 330 comprises a switch arrangement 331 coupled between the second secondary winding $W_{S21}$, $W_{S22}$ and the second input interface.

The switch arrangement comprises a switch capacitor C4. The voltage across the switch capacitor C4 defines or controls the mean voltage of the (adjusted) supply voltage provided to the second input interface. Thus, the voltage V(C4) across the switch capacitor can be labelled a bias voltage.

A first plate C4A of the switch capacitor C4 is connected to a first terminal 121A of the second input interface 121. A second, different plate C4B of the switch capacitor C4 is connected to the second end $W_{E2}$ of the second secondary winding $W_{S21}$, $W_{S22}$.

The switch arrangement 331 comprise a first switch-diode pair S2, D2 and a second switch-diode pair S3, D3. Both switch-diode pairs connect from the second secondary winding $W_{S21}$, $W_{S22}$ to the first plate C4A of the switch capacitor C4. Each switch-diode pair is controllable (e.g., by a switch controller) to controllably allow or prevent current flow from the second secondary winding to the first plate C4A of the switch capacitor (via said switch-diode pair). Each diode of the diode pair prevents or restricts current flow from the first plate of the switch capacitor back to the second secondary winding.

The first switch-diode pair S2, D2 connects the first end $W_{E1}$ of the second secondary winding $W_{S21}$, $W_{S22}$ to the first plate C4A of the switch capacitor. The first end $W_{E1}$ is the other end of the second secondary winding $W_{S21}$, $W_{S22}$ compared to the second end connected to the second plate C4B of the switch capacitor C4.

The second switch-diode pair S3, D3 connects the second secondary winding $W_{S21}$, $W_{S22}$ to the first plate C4A of the switch capacitor C4 from an intermediate position/middle tap $W_{IP}$ of the second secondary winding $W_{S21}$, $W_{S22}$, located between the first and second ends of the second secondary winding. In the illustrated example, the intermediate position $W_{IP}$ is a position located between the two ends of the first winding portion $W_{S21}$ of the second secondary winding.

When only the first switch-diode pair S2, D2 conducts current, the mean voltage across the switch capacitor C5 is larger than when only the second switch-diode pair S3, D3 conducts current. This is because the effective number of turns of the second secondary winding $W_{S21}$, $W_{S22}$ (i.e., the number of turns that contribute to a voltage provided to the switch capacitor C5) is larger when the only the first switch-diode pair S2, D2 conducts current than when only the second switch-diode pair S3, D3 conducts current. Thus, the effective turns ratio (and therefore voltage) of the second secondary winding can be modified by controlling which switch-diode pair is active.

Put another way, a different ratio or proportion of the (maximum potential mean) voltage across the second secondary winding can be provided to the first plate C4A of the switch capacitor based on which switch-diode pair is active and allows current flow.

It is therefore possible to control the magnitude of the mean voltage across the switch capacitor by controlling which of the switch-diode pairs is active, i.e., allows current flow.

The operation of the switches S2, S3 may be controlled by a switch controller 335. In particular, the switch controller may control which switch-diode pair conducts current responsive to a voltage of the offset signal or the superimposed signal.

The switch arrangement may therefore be configured to switch between at least two configurations including: a first configuration in which a first ratio or proportion of the magnitude of the voltage across the second secondary winding is provided to the second input interface as the magnitude of the adjusted supply voltage; and a second configuration in which a second ratio or proportion, lower than the first ratio or proportion, of the magnitude of the voltage across the second secondary winding is provided to the second input interface as the magnitude of the adjusted supply voltage.

In other words, the switch arrangement is configured to be switchable between a first configuration in which a mean voltage across a first ratio or proportion of the second secondary winding is provided to the second input interface as the mean voltage of the supply voltage; and a second configuration in which a mean voltage across a second ratio or proportion, lower than the first ratio or proportion, of the second secondary winding is provided to the second input interface as the mean voltage of the supply voltage.

The switch arrangement may comprise a sensing circuit 336, 336' to sense a voltage of the offset signal and/or a voltage of the superimposed signal. In the illustrated example, the sensing circuit 336 senses a voltage of the offset signal. Alternatively, the sensing circuit 336' senses a voltage of the superimposed signal.

The adjustment circuit (via the switch controller) may be configured to adjust the supply voltage responsive to the sensed voltage of the offset signal and/or the voltage of the superimposed signal.

The adjustment circuit (via the switch controller) may be configured to, for a first voltage of one of the offset signal or the superimposed signal, provide the adjusted supply voltage of a second voltage; and for a third voltage of the one of the offset signal or the superimposed signal, provide the adjusted supply voltage of a fourth voltage.

The first voltage is greater than the third voltage and the second voltage is greater than the fourth voltage.

In this way, the mean value of the supply voltage can be adjusted in-synchronization with the mean value of the offset signal. Thus, the first, second, third and fourth voltage may be mean voltages.

In some examples, the switch arrangement is configured to operate in the first configuration, such that the adjusted supply voltage is high, responsive to the voltage of the offset signal being at or above a first predetermined voltage; and operate in the second configuration, such that the adjusted supply voltage is low, responsive to the voltage of the offset signal being below the first predetermined voltage.

The operation of the switch arrangement may, as previously explained, be performed by the switch controller 335.

For example, when the switch controller 335 senses a large voltage, for example a voltage larger than a threshold, from the circuit 336 or 336', it closes the switch S2 and opens the switch S3 to provide an adjusted large supply voltage; otherwise, it opens the switch S2 and closes the switch S3 to provide an adjusted small supply voltage.

The capacitance of the switch capacitor C4 is sufficiently large that the voltage across the switch capacitor has a substantially constant/stable amplitude when only one of the switch-diode pairs allows current flow. It will be appreciated that the value of this substantially constant/stable amplitude will change if the active switch-diode pair is switched. Thus the term "constant/stable" only means the amplitude is fixed with respect to a respective selected ratio of the voltage on the secondary winding.

In this way, the switch arrangement and the switch capacitor acts as a buffering circuit electrically coupled to the second secondary winding and adapted to generate a bias voltage V(C4) with a substantially constant amplitude in synchronization with the mean value of the offset signal or the superimposed signal.

In addition, it is desired to adjust the phase of the supply voltage to match or be aligned with the phase of the offset signal, wherein the phase of the supply voltage on the secondary winding is originally out of phase, even oppositely phased, with respect to the offset signal. The present application proposes to invert the phase of the supply voltage, and the adjustment circuit comprises an inverting circuit 332. The inverting circuit is configured to subtract, from the constant bias voltage (produced by the switch arrangement or buffering circuit), a voltage proportional to the voltage across the second secondary winding to produce the adjusted supply voltage for the second input interface. Therefore the adjusted supply voltage is in-phase with the offset signal.

In the illustrated example, the inverting circuit comprises a diode D4, an capacitor C5, and an inverting capacitor C3. A first plate C5A of the capacitor C5 is connected to the second 121B terminal of the second input interface 121. A second plate C5B of the capacitor C5 is connected to the second end $W_{E2}$ of the second secondary winding, and therefore the second plate C4B of the switch capacitor C4. The second end $W_{E2}$ of the second secondary winding $W_{S21}$, $W_{S22}$ is also the second end of the second winding portion $W_{S22}$. The inverting capacitor's C3 anode is connected to the anode or first plate C4A of the capacitor C4; and the cathode of the inverting capacitor is connected to the anode or first plate C5A of the capacitor C5. The voltage between the terminals of the second input interface 121, namely the inverting capacitor C3 (i.e., the adjusted supply voltage) is equal to V(C4)-V(C5).

The diode D4 connects a first end WE3 of the second winding portion $W_{S22}$ (being a different end of the second winding portion to the second end $W_{E2}$) to the first plate C5A of the capacitor C5. The capacitance of the capacitor C5 (e.g., <100 μF) is sized sufficiently small such that the instantaneous voltage across the capacitor follows or is in-phase with the PFC output signal (e.g., has an AC mains supply ripple), i.e., and is not smoothed into a constant voltage as performed by the switch capacitor C4. The inverting capacitor C3 is also sized sufficiently small such that the voltage V(C4) on the capacitor C3 still carries the inverted phase of V(C5), and therefore V(C4)-V(C5) follows the phase of the offset signal.

As the voltage between the terminals of the second input interface, i.e., the adjusted supply voltage, is equal to V(C4)-V(C5), this results in the adjusted supply voltage having an inverted phase with respect to the PFC output signal. Thus, the adjusted supply voltage is in-phase with the offset signal V(C2).

Generally, the switch arrangement 331 allows the mean voltage of the (adjusted) supply voltage at the second input interface 121 to follow or be in-synchronization with the mean voltage of at least the offset signal. Thus, if the mean voltage of the offset signal increases (e.g., beyond a predetermined threshold), so the mean voltage of the adjusted supply voltage can increase. Similarly, if the mean voltage of the offset signal decreases (e.g., below a predetermined threshold), so the mean voltage of the adjusted supply voltage can decrease.

Moreover, the inverting circuit 321 also allows the instantaneous voltage of the (adjusted) supply voltage at the second input interface 121 to follow or be in-synchronization with the instantaneous voltage of at least the offset signal. In other words, the inverting circuit allows the phase of the (adjusted) supply voltage to match the phase of at least the offset signal.

Figure 4:
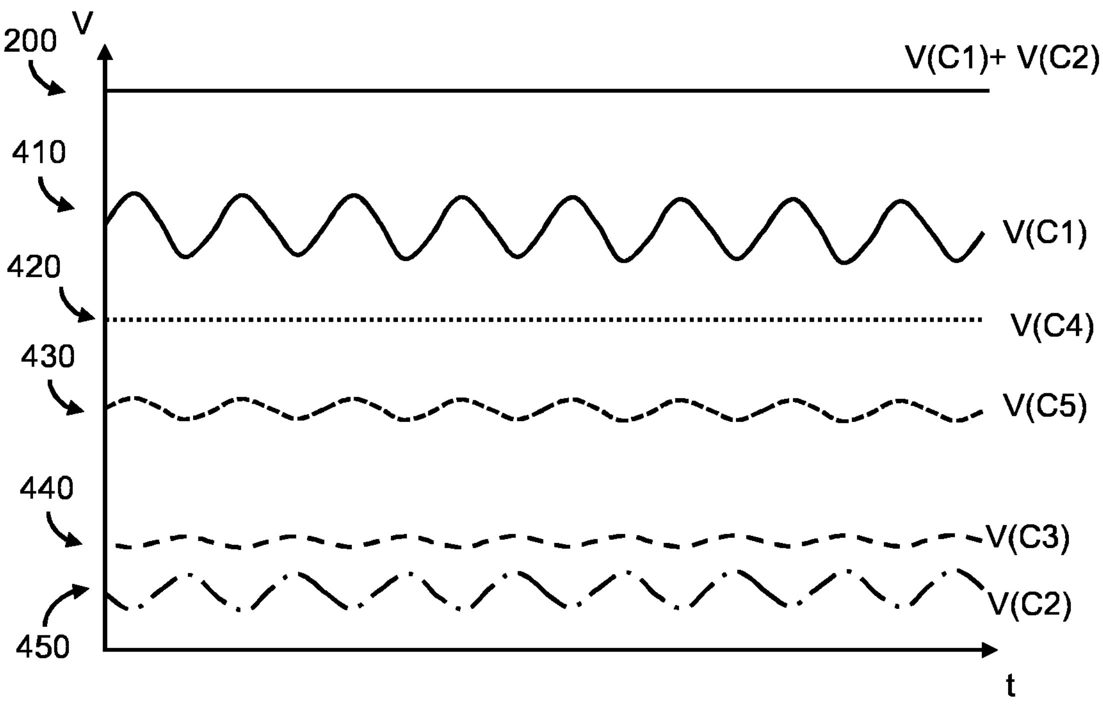
FIG. 4 illustrates waveforms for the proposed driver arrangement in a first scenario.
Figure 5:
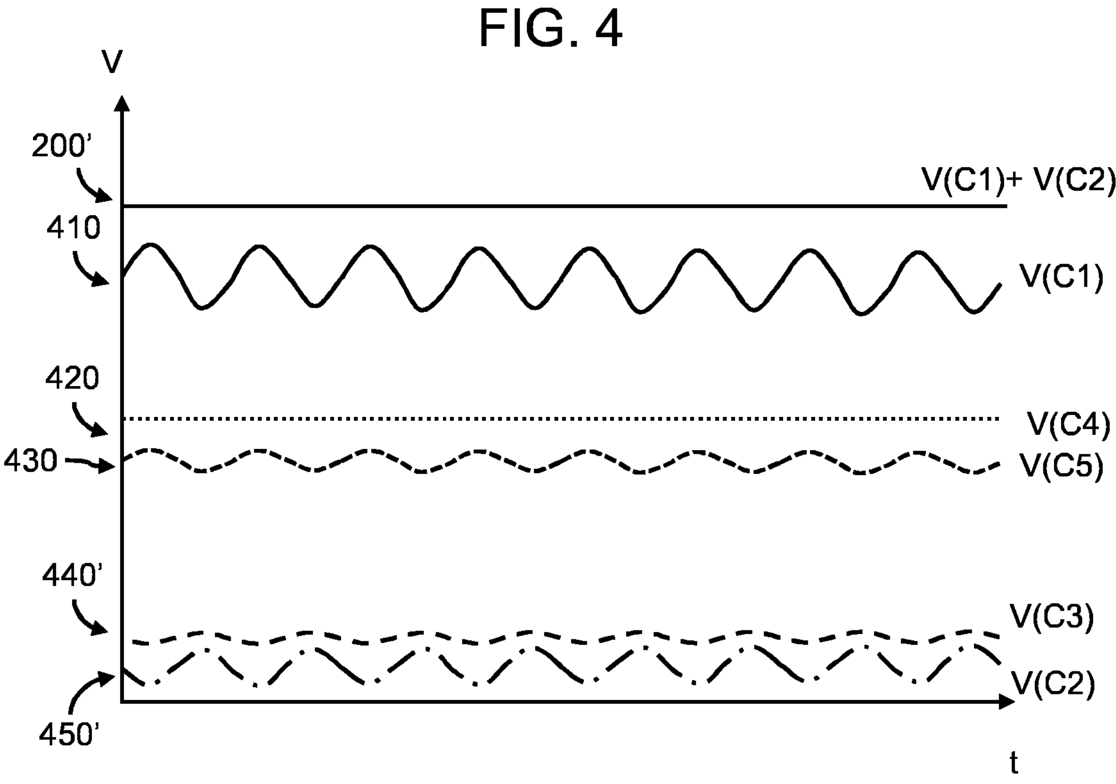
FIG. 5 illustrates waveforms for the proposed driver arrangement in a second scenario.

FIGS. 4 and 5 illustrates sets of waveforms in different scenarios for the purposes of improved understanding. The scale of the two figures are the same thus they can be compared with each other to illustrate that the mean value of the adjusted supply voltage V(C3) follows the mean value of the offset signal.

Both Figures illustrate: a first waveform 410 representing a voltage of the PFC output signal V(C1) across the first output interface 113; a second waveform 420 representing a voltage V(C4) across the switch capacitor C4; a third waveform 430 representing a voltage V(C5) across the capacitor C5; a fourth waveform 440, 440' representing a voltage V(C3) of the supply voltage provided to the second input interface; and a fifth waveform 450, 450' representing a voltage V(C2) of the offset signal. There is also a waveform 200 or 200' showing the voltage of the superimposed signal.

FIG. 4 illustrates a scenario in which the (mean) voltage drawn by the load LED is high, such that the mean voltage of the offset signal V(C2) is correspondingly high.

FIG. 5 illustrates a scenario in which the (mean) voltage drawn by the load LED is lower (than in FIG. 4), such that the mean voltage of the offset signal V(C2) is correspondingly lower.

In both cases, the phase of the supply voltage V(C3) has been adjusted to be synchronous with the voltage of the offset signal.

When the mean voltage V(C3) of the offset signal is lower, the mean voltage of the adjusted supply voltage is also reduced, e.g., by switching from making the first switch-diode pair S2, D2 conduct current to making the second switch-diode pair S3, D3 conduct current. This would reduce the mean value of the voltage V(C4) across the switch capacitor C4, thereby reducing the mean value V(C3) of the adjusted supply voltage (which is equal to V(C4)-V (C5). The difference between V(C3) and V(C2) is therefore limited and the power loss is reduced.

Referring back to FIG. 3, in some embodiments it is possible to omit the inverting circuit. In such examples, the second terminal 121B of the second input interface 121 may be directly connected to the second end $W_{E2}$ of the secondary winding. In such examples, the switch capacitor C4 may also be omitted. This approach would produce an embodiment in which the mean voltage of the supply voltage V(C3) can be changed (via the switch arrangement), e.g., to track or synchronize with a mean voltage of the offset signal. However, the phase of the supply voltage V(C3) would not be synchronized with the phase of the offset signal, so this approach is less advantageous.

Similarly, in some embodiments, it is possible to instead omit the switch-diode pairs. In this scenario, the first plate C4A of the switch capacitor would directly connect to the first end $W_{E1}$ of the secondary winding, e.g. via a diode. This would produce a supply voltage having a phase that would track or be synchronized with the offset signal, but would not have an adjustable mean voltage. This is also less advantageous than the illustrated electronic arrangement as there will be a greater power loss.

There is also proposed an electronic arrangement 30 comprising any herein described driver arrangement 300 and a load LED configured to be powered by the load powering signal produced by such a driver arrangement. Thus, the load is connected to the first output interface 113 and the second output interface 122 of the driver arrangement.

The load may, for instance, comprise one or more light emitting diodes or a light emitting diode arrangement. Other suitable loads will be apparent to the skilled person.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. A driver arrangement comprising a power factor (PFC) converter comprising:

a first input interface configured to receive an AC mains power;

a PFC conversion circuitry configured to perform power factor correction on the AC mains power and generate a PFC output signal having a ripple corresponding to a ripple of the AC mains power; and a first output interface configured to provide the PFC output signal;

a power supply for providing a supply voltage from the AC mains power; and a switched-mode power supply arrangement comprising:

a second input interface coupled to the power supply and configured to receive the supply voltage from the power supply;

a second output interface electrically connected in series with the first output interface; and a switched-mode power supply configured to convert the supply voltage into an offset signal provided to the second output interface, the offset signal being configured to superimpose the PFC output signal, to produce a superimposed signal, and compensate for the ripple corresponding to the AC mains power; and an adjustment circuit electrically coupled between the power supply and the second input interface, and configured to adjust the supply voltage provided to the second input interface to be in-synchronization with the offset signal so as to regulate the difference between the voltage amplitude of the adjusted supply voltage and the voltage amplitude of the offset signal.

2. The driver arrangement of claim 1, wherein the adjustment circuit is adapted to adjust the supply voltage in-synchronization with the offset signal such that the difference between the voltage amplitude of the adjusted supply voltage and the voltage amplitude of the offset signal is regulated, preferably reduced, thereby controlling, preferably reducing, the power loss of the switched-mode power supply.

3. The driver arrangement of claim 1, further comprising:

a sensing circuit to sense a voltage of the offset signal and/or a voltage of the superimposed signal, wherein the adjustment circuit is configured to adjust the supply voltage responsive to the sensed voltage of the offset signal and/or the voltage of the superimposed PFC output signal and the offset signal.

4. The driver arrangement of claim 3, wherein the adjustment circuit is configured to:

for a first voltage of one of the offset signal or the superimposed signal, provide the adjusted supply voltage of a second voltage; and for a third voltage of the one of the offset signal or the superimposed signal, provide the adjusted supply voltage of a fourth voltage, wherein the first voltage is greater than the third voltage and the second voltage is greater than the fourth voltage.

5. The driver arrangement of claim 4, wherein the first, second, third and fourth voltage are instantaneous voltages or mean voltages.

6. The driver arrangement of claim 1, wherein the adjustment circuit is adapted to adjust the mean value of the supply voltage to be in-synchronization with the mean value of the offset signal.

7. The driver arrangement of claim 1, wherein:

the PFC conversion circuitry comprises a transformer having a primary winding electrically coupled to the first input interface and a first secondary winding magnetically coupled to the primary winding and electrically coupled to the first output interface; and the power supply comprises a second secondary winding magnetically coupled to the primary winding, wherein the adjustment circuit is configured to provide an adjustable ratio or proportion of the mean voltage across the second secondary winding to the second input interface as the mean voltage of the supply voltage.

8. The driver arrangement of claim 7, wherein the adjustment circuit comprises a switch arrangement coupled between the second secondary winding and the second input interface, the switch arrangement being configured to switch between at least two configurations including:

a first configuration in which a mean voltage across a first ratio or proportion of the second secondary winding is provided to the second input interface as the mean voltage of the supply voltage; and a second configuration in which a mean voltage across a second ratio or proportion, lower than the first ratio or proportion, of the second secondary winding is provided to the second input interface as the mean voltage of the supply voltage.

9. The driver arrangement of claim 8, wherein the adjustment circuit is configured to adjust the mean value of the supply voltage in-synchronization with the mean value of the offset signal by:

operating the switch arrangement in the first configuration, such that the mean voltage of the adjusted supply voltage is high, responsive to the voltage of the offset signal being at or above a first predetermined voltage; and operating the switch arrangement in the second configuration, such that the mean voltage of the adjusted supply voltage is low, responsive to the voltage of the offset signal being below the first predetermined voltage.

10. The driver arrangement of claim 1, wherein the adjustment circuit is configured to increase the mean voltage of the supply voltage with an increasing mean voltage of the superimposed signal and/or the offset signal.

11. The driver arrangement of claim 1, wherein the adjustment circuit is adapted to adjust the instantaneous value of the supply voltage to be in-synchronization or in-phase with the instantaneous value of the offset signal.

12. The driver arrangement of claim 1, wherein the adjustment circuit comprises:

a buffering circuit electrically coupled to the power supply and adapted to generate a bias voltage with a substantially stable amplitude; and an inverting circuit configured to subtract, from the bias voltage, a voltage proportional to the voltage of the PFC output signal to produce the adjusted supply voltage for the second input interface.

13. The driver arrangement of claim 12, wherein:

the PFC conversion circuitry comprises a transformer having a primary winding electrically coupled to the first input interface and a first secondary winding magnetically coupled to the primary winding and electrically coupled to the first output interface;

the power supply comprises a second secondary winding magnetically coupled to the primary winding, such that a voltage across the second secondary winding changes proportionally with the voltage of the PFC output signal; and the inverting circuit is configured to subtract, from the bias voltage, a voltage proportional to the voltage across the second secondary winding to produce the supply voltage for the second input interface.

14. An electronic arrangement comprising:

the driver arrangement of claim 1; and a load connected to the first output interface and second output interface and configured to be powered by the superimposed signal.

15. The electronic arrangement of claim 14, wherein the load comprises a light emitting arrangement optionally comprising one or more light emitting diodes.

* * * * *